United States Patent
Eccles et al.

(10) Patent No.: US 7,077,631 B2
(45) Date of Patent: *Jul. 18, 2006

(54) RAM AIR TURBINE WITH SPEED INCREASING GEARBOX

(75) Inventors: Steven R. Eccles, Torrance, CA (US); Wayne G. Schindler, Huntington Beach, CA (US); Wei-Shing Chaing, Diamond Bar, CA (US)

(73) Assignee: Honeywell International, Inc., Morristown, NJ (US)

( * ) Notice: Subject to any disclaimer, the term of this patent is extended or adjusted under 35 U.S.C. 154(b) by 51 days.

This patent is subject to a terminal disclaimer.

(21) Appl. No.: 10/704,643

(22) Filed: Nov. 12, 2003

(65) Prior Publication Data

US 2005/0129517 A1    Jun. 16, 2005

Related U.S. Application Data

(63) Continuation of application No. 10/011,075, filed on Dec. 6, 2001, now Pat. No. 6,676,379.

(51) Int. Cl.
*F01D 7/02*    (2006.01)

(52) U.S. Cl. .............................. 416/170 R; 415/122.1; 416/142; 244/58

(58) Field of Classification Search ............. 415/122.1, 415/124.1; 416/142, 170 R; 74/52, 98, 74/332, 393; 244/54, 56, 58
See application file for complete search history.

(56) References Cited

U.S. PATENT DOCUMENTS

| | | | |
|---|---|---|---|
| 2,986,219 A | 5/1961 | Boardman, Jr. et al. | |
| 4,578,019 A | 3/1986 | Safarik | |
| 4,671,737 A | 6/1987 | Whitehouse | |
| 4,692,093 A | 9/1987 | Safarik | |
| 5,249,924 A | 10/1993 | Brum | |
| 5,484,120 A | 1/1996 | Blakeley et al. | |
| 5,487,645 A | 1/1996 | Eccles | |
| 5,562,417 A | 10/1996 | Grimm et al. | |
| 5,564,903 A | 10/1996 | Eccles et al. | |
| 6,145,308 A | 11/2000 | Bueche et al. | |
| 6,420,808 B1 | 7/2002 | Hösle | |

FOREIGN PATENT DOCUMENTS

| | | |
|---|---|---|
| EP | 0 045 264 | 2/1982 |
| EP | 0 712 996 | 5/1996 |
| EP | 1 046 838 | 10/2000 |
| FR | 1173681 | 2/1959 |
| WO | WO 00/17543 | 3/2000 |

*Primary Examiner*—Edward K. Look
*Assistant Examiner*—Dwayne J White
(74) *Attorney, Agent, or Firm*—Oval Caglar, Esq.

(57) ABSTRACT

A ram air turbine power system includes a ram air turbine having a turbine shaft, turbine blades for rotating the turbine shaft; and an electrical generator or other power source device driven by a power shaft, for providing power. The power shaft has a generally hollow tubular shape, and the turbine shaft extends coaxially within the power shaft. The ram air turbine power system also includes a gearbox housing a planetary gear train, where one end of the gear train is a planetary sun gear spline coupled to the power shaft and the other end of the gear train is a planetary ring gear spline coupled to the turbine shaft so that the rotating turbine shaft drives the power shaft through the gear train increasing the speed of the power shaft over the speed of the turbine shaft.

12 Claims, 4 Drawing Sheets

RAM AIR TURBINE WITH SPEED INCREASING GEARBOX

This application is a continuation of application Ser. No. 10/011,075 filed Dec. 6, 2001 now U.S. Pat. No. 6,676,379.

BACKGROUND OF THE INVENTION

The present invention generally relates to ram air turbines of the type used on aircraft to drive backup electric or hydraulic power systems and, more particularly, to a ram air turbine having an in-line speed increasing planetary gearbox for driving an electrical generator or hydraulic pump.

Ram air turbine power systems (RATs) are generally known in the aerospace industry for use in driving auxiliary power systems in the event of a primary system failure. Commercial aircraft manufacturers install RATs as an emergency form of power when the main engine generators or hydraulic pumps are not operating. The ram air turbine power system is commonly stored within the wing or fuselage of an aircraft for deployment into the air stream when needed. When called upon for electrical power, the RAT is deployed into the air stream, typically by swinging it out from its wing or fuselage compartment at the end of a support strut, and functions similar to a windmill by extracting energy from the flowing air along the aircraft in flight. The ram air turbine portion of the RAT typically includes two or more turbine blades adapted to be driven by the air stream, to provide a rotary output which can be used to drive an electrical generator, a hydraulic pump or both. Such ram air turbines are commonly equipped with a speed control governor for altering turbine blade pitch angle, or feathering, to achieve a substantially constant turbine rotational speed despite variations in air speed or load.

When designing aircraft components, important factors to address are size, weight, and reliability. In an effort to reduce the physical size, also referred to as "envelope", of an electrical generator or other power source device that is driven by a RAT, one method is to increase the speed at which the generator or other power source device operates. But the RAT turbine may have an optimum speed that is slower than the increased generator speed. Prior art, for example, U.S. Pat. No. 5,484,120, teaches the use of a gear train as a means of transmitting shaft rotation up through a hollow support strut between the RAT turbine and a driven device at the top of the support strut within the aircraft, using spur gears and bevel gears. The use of such a drive shaft extending through the support strut to drive a power source device within the aircraft is comparatively long and heavy relative to using a short drive shaft to drive the power source device adjacent to the RAT turbine, and the spur gears and bevel gears may sustain a relatively high gear tooth loading, detracting from reliability. The problem of reducing generator envelope and weight is not addressed.

As can be seen, there is a need to reduce the envelope and weight of RATs while improving their reliability. There is also a need for reducing the envelope and weight of the generator or other power source device driven by the RAT turbine. Moreover, there is a need for providing an efficient arrangement of components in the RAT.

SUMMARY OF THE INVENTION

The present invention reduces the envelope and weight of RATs while improving reliability by using a gear-train with reduced tooth loads. The present invention also reduces the envelope and weight of the generator or other power source device driven by the RAT turbine by increasing the speed of the power source device. Moreover, the present invention provides an efficient in-line arrangement of components in the RAT by keeping the turbine, the driven power source device, and gearbox components coaxial to improve overall packaging of the RAT power system.

In one aspect of the present invention, a ram air turbine power system includes a ram air turbine having a turbine shaft projecting rearward, and turbine blades for rotating the turbine shaft; a power source device having a rotatable power shaft for generating power in response to rotation of the power shaft for providing a power source. The power shaft has a generally hollow tubular shape defining a rear end, and the turbine shaft extends coaxially within the power shaft and also has a rear end. The ram air turbine power system also includes a gearbox housing a gear train, where one end of the gear train is connected to the power shaft near the rear end of the power shaft and the other end of the gear train is connected to the turbine shaft near the rear end of the turbine shaft so that the rotating turbine shaft drives the power shaft through the gear train.

In another aspect of the present invention, a gearbox is adapted for in-line driving of a power shaft by a turbine shaft in a ram air turbine power system having a ram air turbine with turbine blades for rotating the turbine shaft and having a power source device where the power shaft defines front and rear ends and is supported to rotate within the power source device for driving a power generation apparatus to provide a power source. The gearbox includes a gear train having a driven gear and a driving gear. The driven gear is connected to the power shaft near the rear end of the power shaft and the driving gear is connected to the turbine shaft near the rear end of the turbine shaft whereby the rotating turbine shaft drives the driving gear, the driving gear rotates to drive the driven gear through the gear train, and the driven gear drives the power shaft.

In yet another aspect of the present invention, a ram air turbine power system includes a ram air turbine having a turbine shaft projecting rearward, and turbine blades for rotating the turbine shaft. The ram air turbine power system also includes an electrical generator for providing an electrical power source. The electrical generator has a rotatable power shaft. The power shaft has a generally hollow tubular shape defining a rear end, and the turbine shaft extends generally coaxially within the power shaft and also has a rear end. The ram air turbine power system also includes a gearbox housing an epicyclic star gear system. The epicyclic star gear system has an output gear and an input gear, the output gear may be a planetary sun gear, which is spline coupled to the power shaft near the rear end of the power shaft, and the input gear may be a planetary ring gear, which is spline coupled to the turbine shaft near the rear end of the turbine shaft, whereby the rotating turbine shaft drives the input gear, the rotating input gear drives the output gear through a gear train, which may include planet gears supported on a stationary bearing housing, and the output gear drives the power shaft, whereby the power shaft rotates at a greater speed than the turbine shaft.

In still another aspect of the present invention, a method for power generation includes the steps of, first, deploying a ram air turbine having a turbine shaft projecting rearward, and turbine blades for rotating the turbine shaft; second, using the ram air turbine to drive an electrical generator for providing an electrical power source, the electrical generator being driven by a rotatable power shaft, the power shaft having a generally hollow tubular shape defining a rear end, the turbine shaft extending generally coaxially within the power shaft and also having a rear end; and, third, driving the rotatable power shaft of the electrical generator through a gearbox including an epicyclic star gear system, the epicyclic star gear system having an output gear and an input gear. The output gear may be a planetary sun gear, spline coupled to the power shaft near the rear end of the power shaft, and the input gear may be a planetary ring gear, spline coupled to the turbine shaft near the rear end of the turbine shaft, whereby the rotating turbine shaft drives the input gear, the rotating input gear drives the output gear through a gear train, which may include planet gears, and the output gear drives the power shaft, whereby the power shaft rotates at a greater speed than the turbine shaft.

These and other features, aspects and advantages of the present invention will become better understood with reference to the following drawings, description and claims.

DETAILED DESCRIPTION OF THE INVENTION

Figure 1:
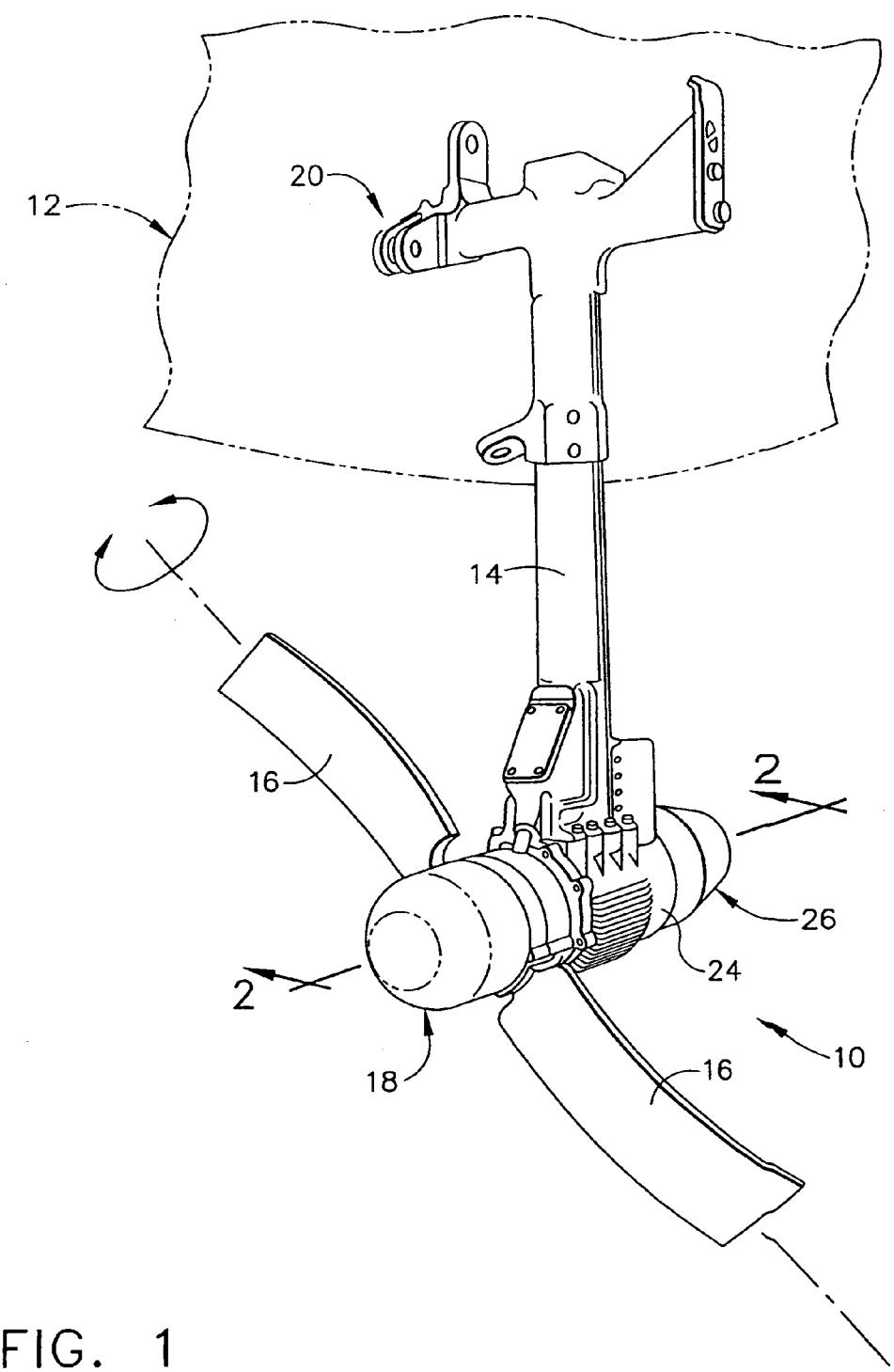
FIG. 1 is a perspective view illustrating a ram air turbine with speed increasing gearbox according to one embodiment of the present invention, deployed from an aircraft.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention reduces the envelope and weight of ram air turbine power systems (RATs), for use in aircraft or other applications where a wind or air flow driven power source is practicable, by using a gear train to increase the speed of the power source device. For example, the power source device may be an electrical generator driven by the ram air turbine. Increasing the speed at which the electrical generator is driven may allow reductions in both the envelope and weight of the electrical generator, or other power source device, while maintaining substantially the same power output. To increase the speed of the power source device, an epicyclic star gear system, also referred to as a planetary gear train, may be provided in a gearbox also referred to as a speed increasing gearbox. For example, in one embodiment of the present invention, an optimal ram air turbine speed is approximately 4,000 revolutions per minute (rpm) and an optimal electrical generator speed is 12,000 rpm so that a planetary gear train with an overall ratio of 3:1 is appropriate. The planetary gear train increases reliability of the ram air turbine power system by transmitting torque through three planet gears, and reducing gear tooth loads, in contrast to the spur gear and bevel gear arrangements used exclusively for providing power transmission in prior art ram air turbine power systems, thereby lowering wear and incidence of failure of gear train components.

Moreover, the present invention provides an efficient in-line arrangement of components in the ram air turbine power system by keeping the ram air turbine, the driven power source device, and gearbox components coaxial to improve overall packaging of the ram air turbine power system. The in-line configuration is efficient in many respects, including mechanically, aerodynamically, and in terms of providing maximal power output for minimal weight and envelope. The planetary gear train which may be provided in the speed increasing gearbox facilitates the in-line configuration by keeping the turbine, gearbox, and power unit components coaxial, contributing to the overall efficiency, light weight, and low envelope of the ram air turbine power system. The in-line arrangement provided by the planetary gear train has an overall size envelope that is smaller in comparison to both spur and bevel gear assemblies used in the prior art. System weight is also reduced in comparison to the prior art.

Another advantage provided by one embodiment of the present invention is serviceability of the gearbox. The entire gearbox can be inspected, or replaced, by simply removing the back cover. The three planet gears and outer ring gear may be supported upon a stationary bearing housing. The bearing housing with attached gears can be easily bolted to the generator housing. Additionally, a ground cart motor can easily be attached to the aft of the gearbox for ground check and spin up if required. The ground cart motor would only need to rotate at the normal speed of the ram air turbine, approximately 4000 rpm, because the turbine shaft projects rearward, carrying the turbine speed all the way through the in-line assembly to the extreme aft end of the gearbox, where the ground cart motor may be connected.

Referring now to FIG. 1, ram air turbine power system 10 according to one embodiment of the present invention is illustrated deployed from an aircraft 12. Ram air turbine power system 10 may be used to drive one or more auxiliary power systems in aircraft 12. An in-line ram air turbine power system similar to the one shown and described in FIG. 1 is disclosed in U.S. Patent entitled "In-Line Ram Air Turbine Power System", U.S. Pat. No. 5,564,903, issued on Oct. 15, 1996, and assigned to the assignee of the present invention. The disclosure in that patent is hereby incorporated by reference into the present application. As illustrated in FIG. 1, ram air turbine power system 10 may be suspended from aircraft 12 by means of strut 14 and includes a pair of turbine blades 16 projecting radially outwardly from a rotary hub of ram air turbine 18. Ram air turbine 18 may include a speed control governor means (not shown in FIG. 1) of the type described, for example, in U.S. Pat. No. 5,487,645, issued Jan. 30, 1996, entitled "Ram Air Turbine With Secondary Governor," which is assigned to the assignee of the present invention and is incorporated by reference into the present application. The speed control governor means may be used, for example, for adjusting the pitch angle of turbine blades 16 in a manner to achieve rapid turbine acceleration to substantially full speed rotation, when ram air turbine 18 is deployed. Thereafter, the speed control means maintains a substantially constant turbine speed despite variations in air speed or turbine load.

Ram air turbine power system 10 is normally stored within a suitable compartment in the fuselage or wing of aircraft 12. In the event of a primary power system failure, ram air turbine power system 10 may be deployed quickly and easily by pivoting strut 14 relative to mounting assembly 20, thereby moving ram air turbine power system 10 to an exposed position within the air stream flowing past aircraft 12. In general terms, turbine blades 16 are rotatably driven by the surrounding air stream, to correspondingly drive ram air turbine 18, whereby turbine shaft 22 projecting rearward (as more clearly seen in FIGS. 2 and 3) provides a rotary output for driving an auxiliary power unit, such as electrical generator 24 or a hydraulic pump (not shown in any of the figures) or both. The hydraulic pump may be, for example, a swash plate pump, as known in the art. Electrical generator 24 may be driven through speed increasing gearbox 26. FIG. 1 illustrates the auxiliary power units, which may be electrical generator 24 or a hydraulic pump, or both, and speed increasing gearbox 26 arranged in an in-line configuration with ram air turbine 18.

Figure 2:
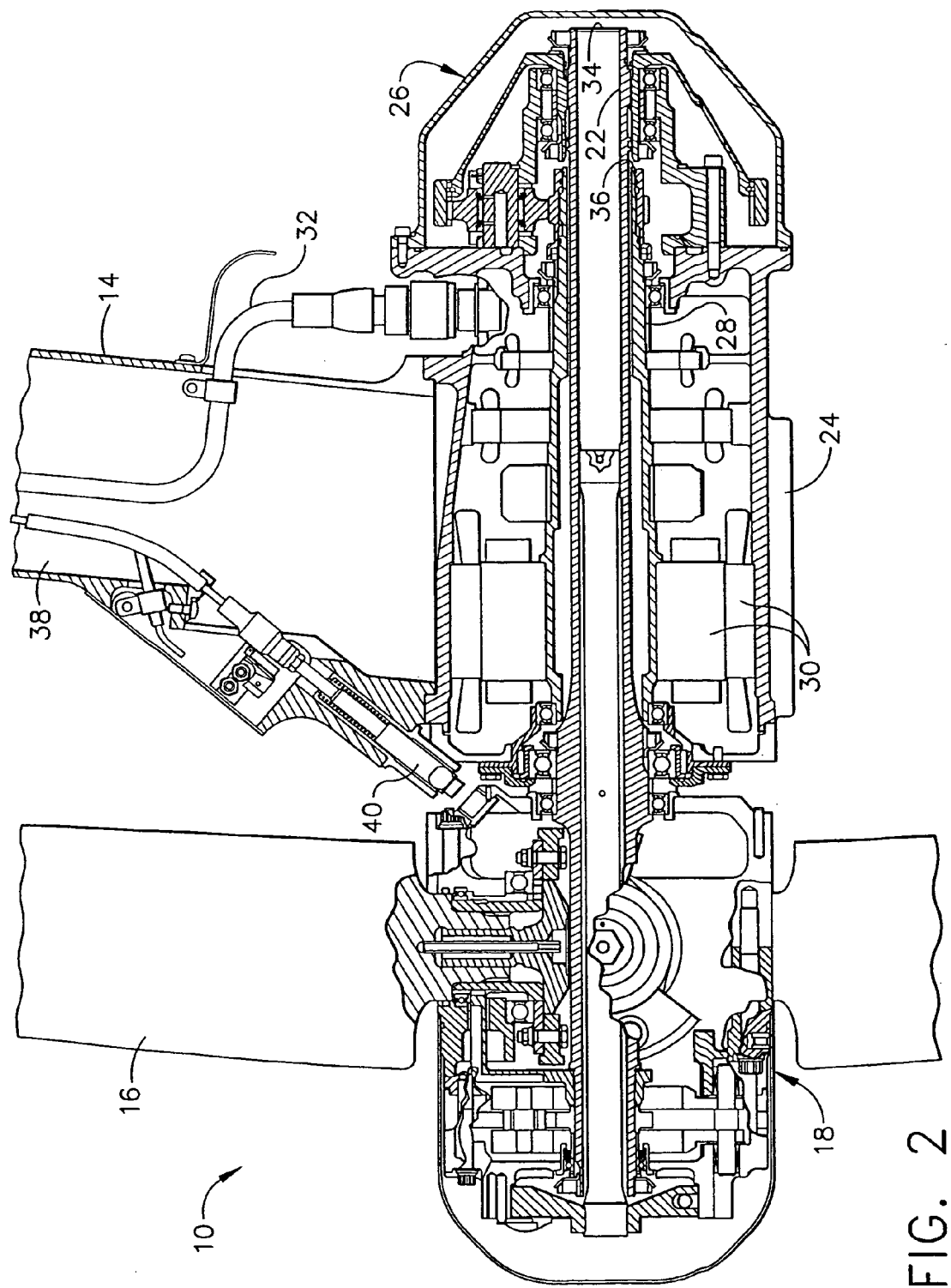
FIG. 2 is a longitudinal sectional view, taken generally on the line 2—2 of FIG. 1, of a ram air turbine with speed increasing gearbox according to one embodiment of the present invention.

Referring now to FIG. 2, a longitudinal sectional diagram of ram air power system 10 shows turbine shaft 22 may be rotatably supported within bearings mounted in electrical generator 24, or other power source device, thereby avoiding a separate bearing carrier structure disposed between ram air turbine 18 and electrical generator 24, or other power source device. The bearings may be provided in an arrangement to rotatably support power shaft 28 coaxially with turbine shaft 22. In order to dispose turbine shaft 22 and power shaft 28 coaxially with respect to one another, either one or both may be fabricated in the form of a hollow tubular shaft. In the embodiment illustrated in FIG. 2, both turbine shaft 22 and power shaft 28 are shown as hollow tubular shafts, with power shaft 28 coaxially disposed radially outwardly of turbine shaft 22. In the present example used to illustrate one embodiment, in which the power source device may include electrical generator 24, power shaft 28 may be appropriately associated with generator elements 30 for generating electrical power which may be suitably coupled via conductor cables 32 to aircraft 12. In general, power shaft 28 may be appropriately associated with power source device elements 30 for generating power which may be suitably coupled to aircraft 12 via appropriate power conducting means. Details of a bearing system for supporting ram air turbine shaft 22 coaxially with power shaft 28 within a bearing system which may be mounted in an electrical generator, or other power source device, are disclosed in U.S. Pat. No. 5,564,903, referenced above.

Turbine shaft 22 has rear end 34 which may be coupled, for example, by splines formed on turbine shaft 22, or by other means, to one end of a gear train or other means, including direct coupling, for transmitting rotation to power shaft 28. Power shaft 28 has a rear end 36 which may be coupled, for example, by splines formed on power shaft 28, or by other means, to another end of a gear train or other means, including direct coupling, for being rotated by turbine shaft 22. In one embodiment, as seen in FIG. 2, power shaft 28 is rotatably driven through an epicyclic star gear system, also referred to as a planetary gear train, by turbine shaft 22. The epicyclic star gear system is located within gearbox 26 and is described in more detail below in connection with FIG. 3.

Many other possible embodiments and configurations in addition to that shown in FIG. 2 are contemplated by the present disclosure. One or more alternate or additional power sources may be required. For example, and not by way of limitation, a hydraulic pump may be required in addition to the electrical generator as shown in FIG. 2. If both the electrical generator and hydraulic pump need to rotate at the same increased speed, the planetary gearbox 26 can be located just aft of ram air turbine 18 and forward of the generator and pump. Another possible embodiment would be to mount a hydraulic pump, or other second power source device, aft of gearbox 26 in the in-line arrangement shown in FIG. 2, to provide an in-line arrangement of a ram air turbine followed by a first power source device followed by gearbox 26 followed by a second power source device. The second power source device, or hydraulic pump in this example, may be connected directly to the turbine shaft, allowing the hydraulic pump to rotate at the slower turbine speed while the electrical generator is allowed to rotate at the increased speed.

Also, as seen in FIGS. 1 and 2, the in-line ram air turbine power system 10, according to one embodiment, is carried at the lower end of strut 14, which may be hollow. Strut 14 is adapted, as known in the art, for pivotal movement relative to mounting assembly 20 between a normal stored position within the fuselage or wing of an aircraft, and a downwardly protruding deployed position as illustrated in FIGS. 1 and 2. Hollow strut 14 defines a passage 38 through which conductor cables 32 from electrical generator 24 may pass to aircraft 12. Similarly, as in the examples given above illustrating alternative or additional power source devices, and in which a hydraulic pump is used as an example power source device, hydraulic flow lines from the hydraulic pump may be conveniently passed through hollow strut 14 to aircraft 12. In addition, as may be desired, other mechanical linkage structures such as a retractable release pin 40 for releasing ram air turbine 18 upon deployment may also extend through hollow strut 14. With this construction, the entire ram air turbine power system 10, including strut 14, may have a desirable aerodynamic shape and may have couplings, such as conductor cables 32, and linkages, such as retractable release pin 40, protectively concealed against wind or other damage.

Figure 3:
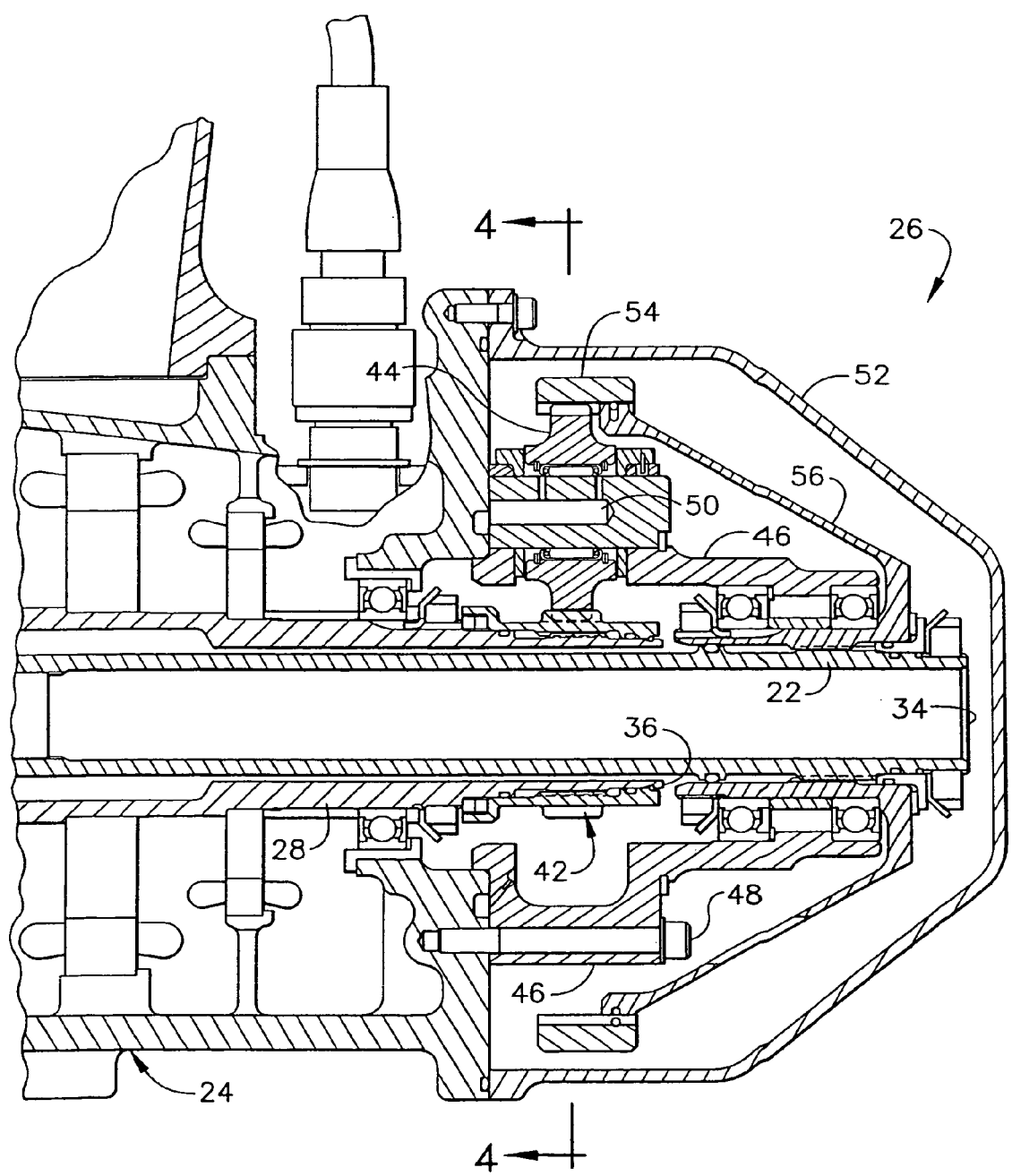
FIG. 3 is a magnified longitudinal sectional view, showing a portion of FIG. 2 in greater detail, of a ram air turbine with speed increasing gearbox according to one embodiment of the present invention.
Figure 4:
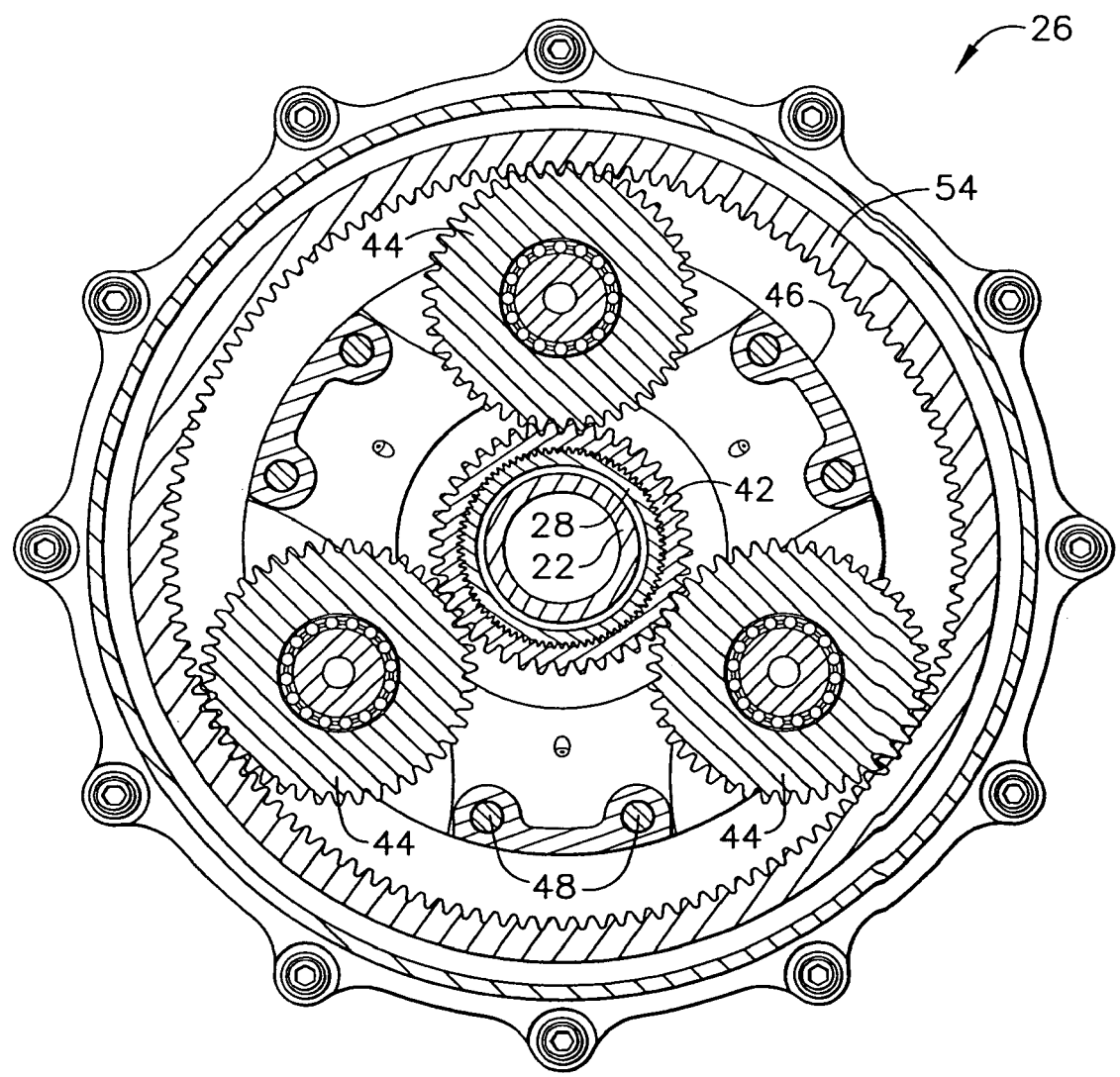
FIG. 4 is a cross sectional view, taken generally on the line 4—4 of FIG. 3 and of FIG. 2, of a speed increasing gearbox for a ram air turbine, according to one embodiment of the present invention.

Referring now to FIGS. 3 and 4, FIG. 3 illustrates a longitudinal sectional diagram of gearbox 26, and FIG. 4 illustrates a cross sectional diagram of gearbox 26. As seen in FIG. 3, turbine shaft 22 projects rearward beyond rear end 36 of power shaft 28. Turbine shaft 22 also has a rear end 34. A sun gear 42, of an epicyclic star gear system may be splined, or otherwise suitably mechanically coupled, to power shaft 28, generally near rear end 36 of power shaft 28 in the embodiment illustrated in FIGS. 3 and 4. Sun gear 42 meshes with a set of planet gears 44 supported by a stationary bearing housing 46. Stationary bearing housing 46 with attached gears may be easily bolted, for example, to the housing of electrical generator 24, or other power source device, using bolts 48.

Stationary bearing housing 46 may also include lubrication passages, such as lubrication passage 50. Lubrication passage 50 is shown in the area of planet gears 44, additional passages forming part of a lubrication system would be drilled holes or tubes within gearbox 26. Although not illustrated in FIGS. 3 and 4, the present invention contemplates that a lubrication system would be required. The lubrication system would include an oil sump, small pump, and additional lubrication passages. It is intended to alter planetary gearbox cover 52 to form an oil sump cavity. The lubrication pump would be either a simple gear pump, or a "Gerotor" type pump, as known in the art. Both pump types could be driven off the large planetary ring gear 54.

Planetary ring gear 54 meshes with and drives planet gears 44, which mesh with and drive sun gear 42. Planetary ring gear 54 of an epicyclic star gear system may be splined, or otherwise suitably mechanically coupled, to turbine shaft 22, generally near rear end 34 of power shaft 28 in the embodiment illustrated in FIGS. 3 and 4. For example, planetary ring gear 54 may be connected, as illustrated in FIG. 3, near rear end 34 of turbine shaft 22 through connector 56 which may be described as having the form of a truncated cone connecting turbine shaft 22 to planetary ring gear 54. Planetary ring gear 54 may also be referred to as an input gear, as power is input to the epicyclic star gear system or planetary gear train of gearbox 26 at the ring gear end of the gear train. Similarly, sun gear 42 may also be referred to as an output gear, as power is output from gearbox 26 at the sun gear end of the gear train.

As described above, many other possible embodiments and configurations in addition to that shown in the Figures are contemplated by the present disclosure. For example, in addition to electrical generator 24, an embodiment may further include a hydraulic pump connected to turbine shaft 22 either directly or indirectly through gearbox 26. By using appropriate design and placement of the various components, as will be apparent to a person of ordinary skill in the art, a number of different in-line configurations could be realized, a few of which have been described above.

It should be understood, of course, that the foregoing relates to preferred embodiments of the invention and that modifications may be made without departing from the spirit and scope of the invention as set forth in the following claims.

We claim:

1. A deployable ram air turbine power system comprising:
   a ram air turbine having a turbine shaft;
   a power shaft; and
   a gear train that transfers rotation from said turbine shaft to said power shaft, wherein
   said power shaft is part of a first power source device; and
   said gear train comprises a gear train disposed forward of said first power source device.

2. The deployable ram air turbine power system of claim 1, wherein said gear train comprises a planetary gear train having a sun gear coupled to said power shaft.

3. The deployable ram air turbine power system of claim 1, wherein said gear train comprises a planetary gear train having a planetary ring gear coupled to said turbine shaft.

4. The deployable ram air turbine power system of claim 1, wherein said gear train comprises a planetary gear train disposed in-line to said turbine shaft.

5. The deployable ram air turbine power system of claim 1, wherein said gear train comprises a planetary gear train disposed in-line to said power shaft.

6. The deployable ram air turbine power system of claim 1, wherein said gear train comprises a planetary gear train disposed aft of said ram air turbine.

7. deployable ram air turbine power system comprising:
   a ram air turbine having a turbine shaft;
   a power source device;
   a power shaft coupled to said power source device; and
   a gear train that transfers rotation from said turbine shaft to said power shaft,
   wherein said power shaft is coupled to said power source device aft of said ram air turbine.

8. The deployable ram air turbine power system of claim 7, wherein said gear train comprises a planetary gear train disposed in-line to said turbine shaft.

9. The deployable ram air turbine power system of claim 7, wherein said gear train comprises a planetary gear train disposed in-line to said power shaft.

10. The deployable ram air turbine power system of claim 7, wherein said gear train comprises a planetary gear train disposed aft of said ram air turbine.

11. The deployable ram air turbine power system of claim 7, wherein said gear train comprises a planetary gear train having a sun gear coupled to said power shaft.

12. The deployable ram air turbine power system of claim 7, wherein said gear train comprises a planetary gear train having a planetary ring gear coupled to said turbine shaft.

* * * * *